Feb. 26, 1963
R. R. KOOIMAN
3,079,576
INTEGRAL STRAIN TRANSDUCER
Filed Feb. 1, 1961
6 Sheets-Sheet 1
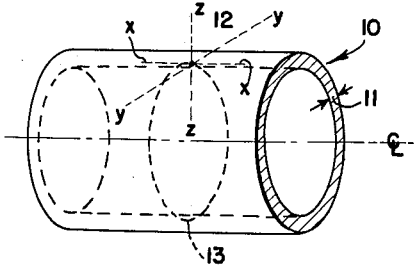
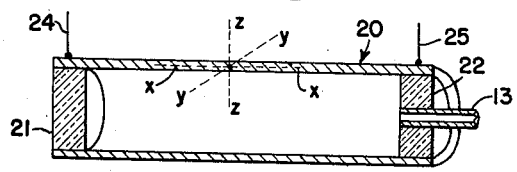
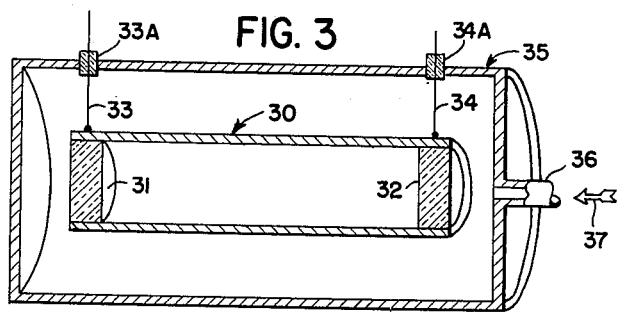
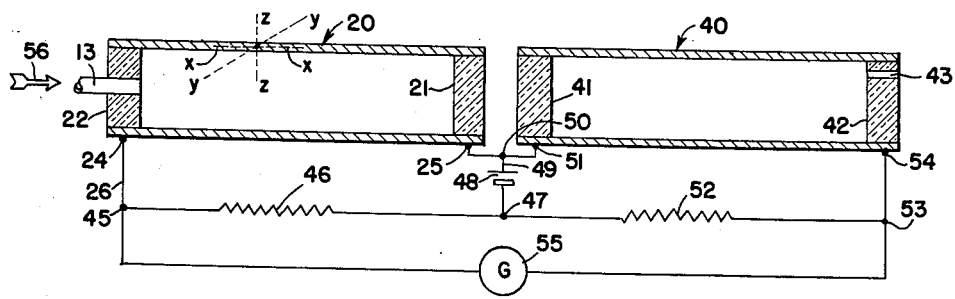
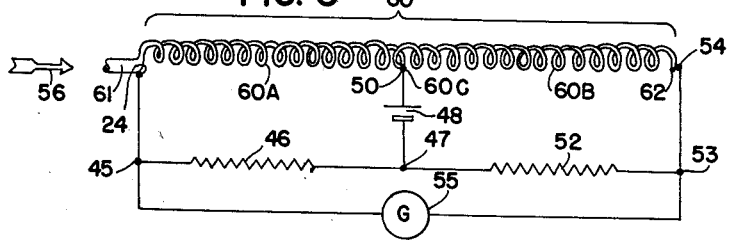
INVENTOR.
ROBERT R. KOOIMAN
BY *Dugger & Johnson*
ATTORNEYS

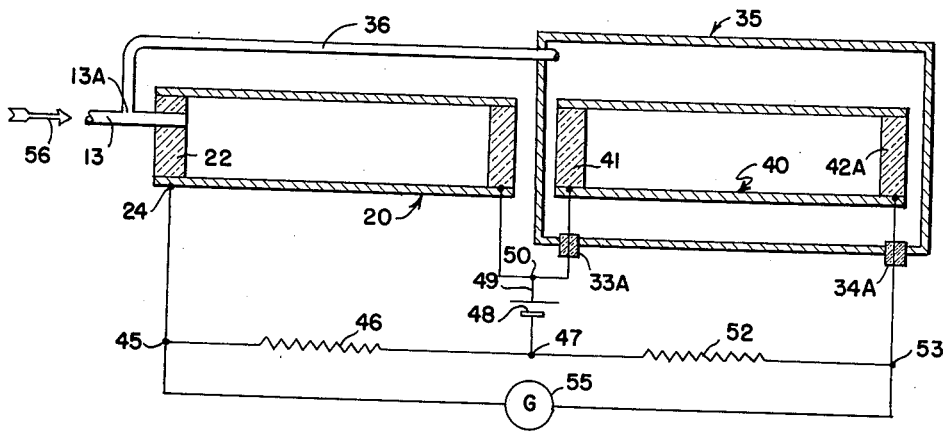
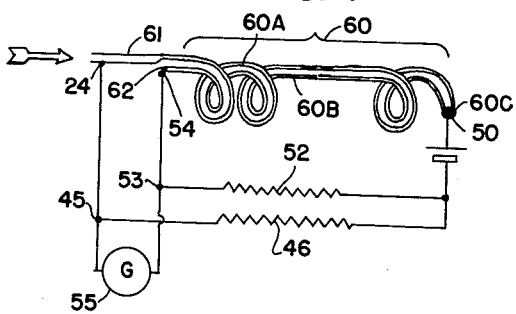
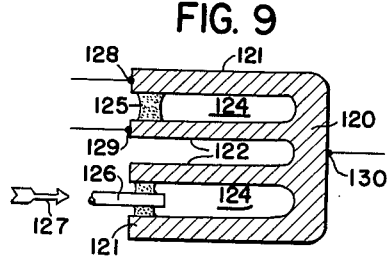
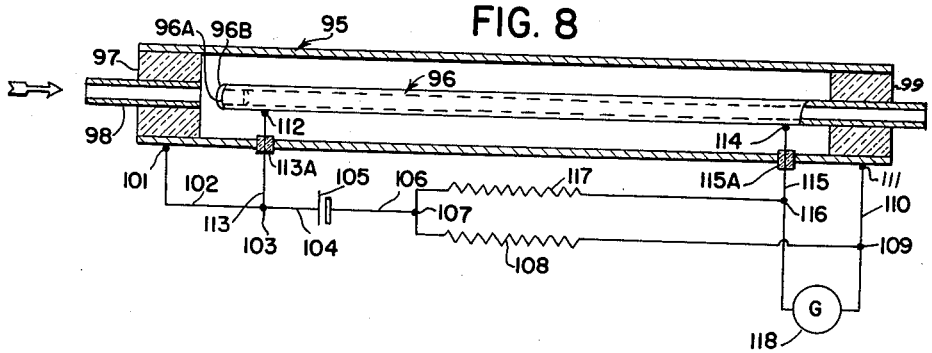

Feb. 26, 1963
R. R. KOOIMAN
3,079,576
INTEGRAL STRAIN TRANSDUCER
Filed Feb. 1, 1961
6 Sheets-Sheet 3
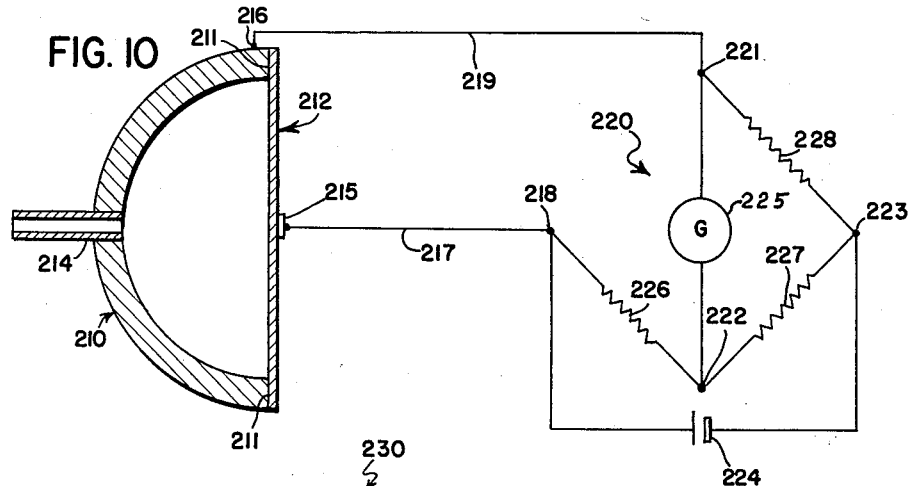
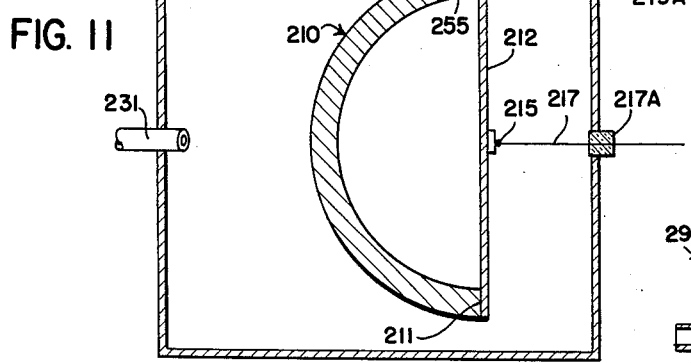
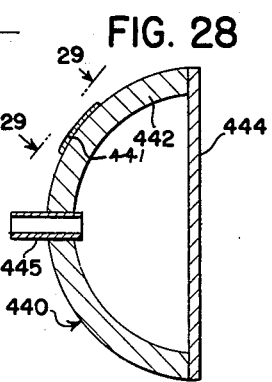
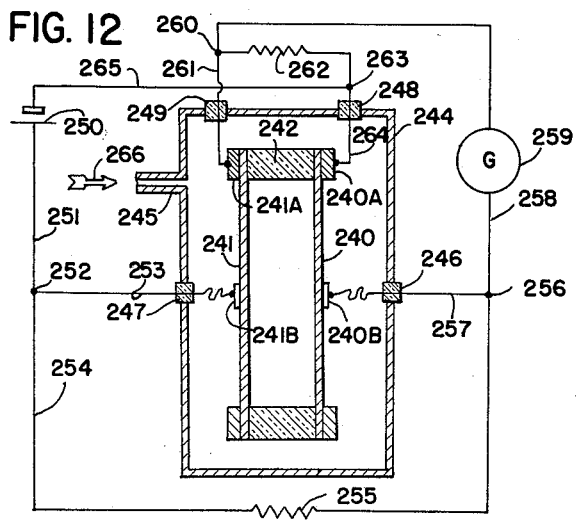
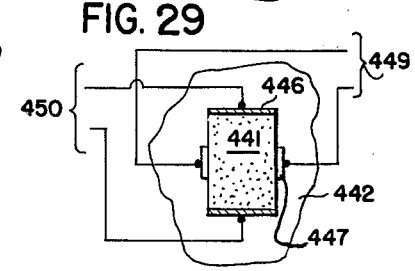
INVENTOR.
ROBERT R. KOOIMAN
BY Dugger & Johnson
ATTORNEYS

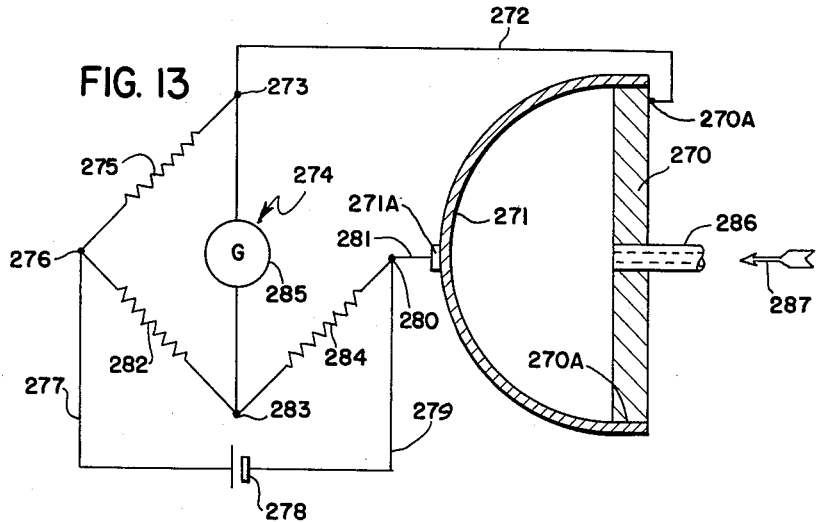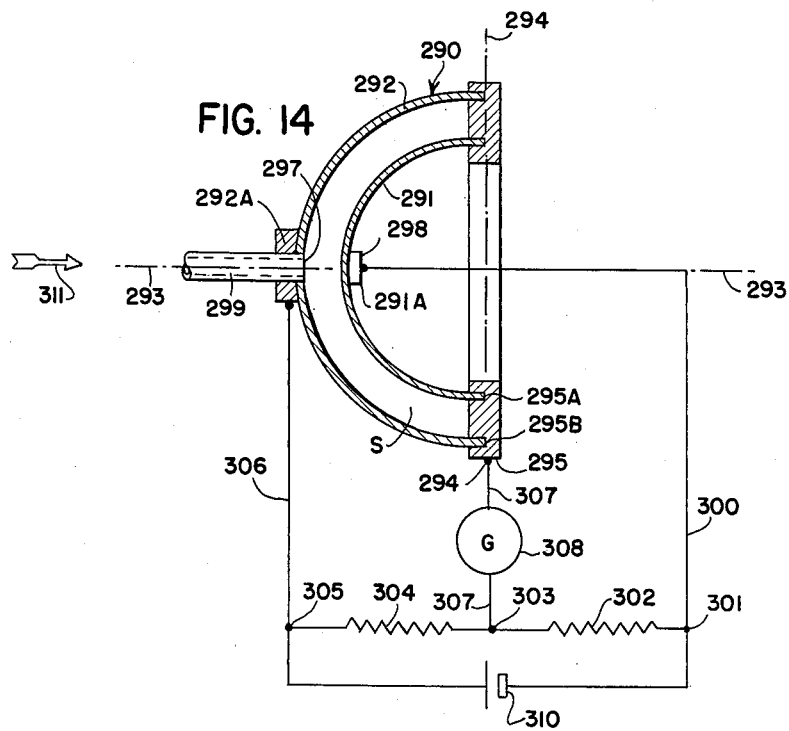

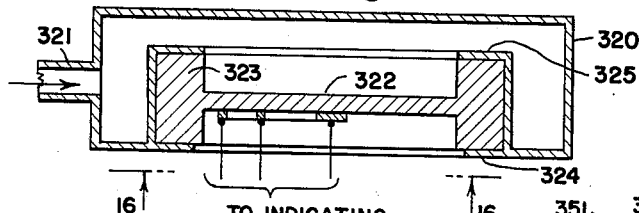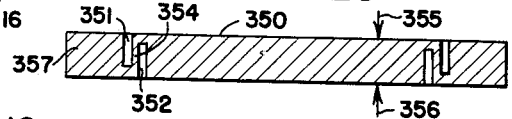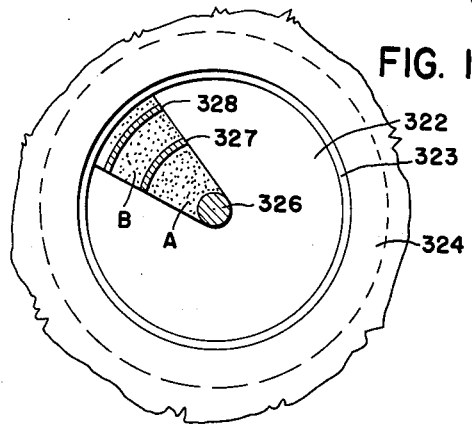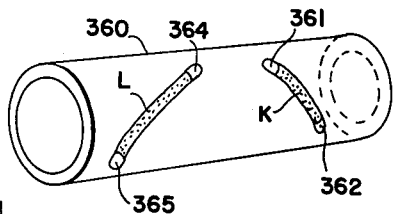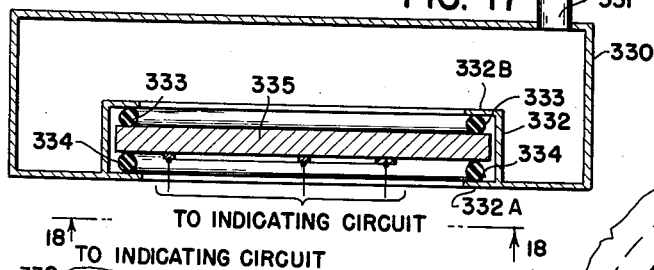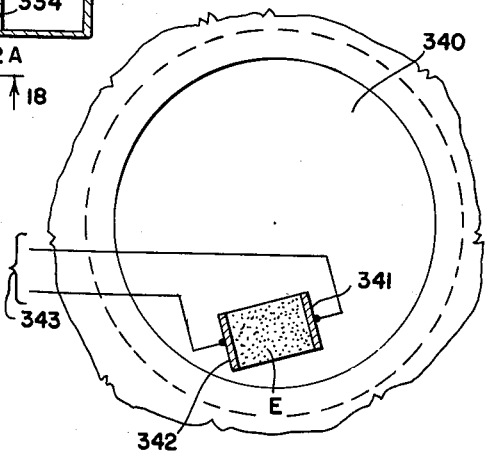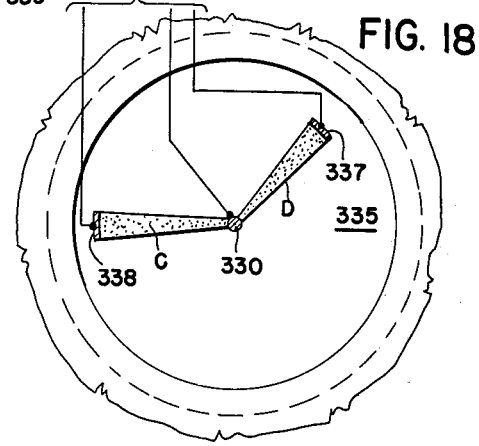

Feb. 26, 1963
R. R. KOOIMAN
3,079,576
INTEGRAL STRAIN TRANSDUCER
Filed Feb. 1, 1961
6 Sheets-Sheet 6
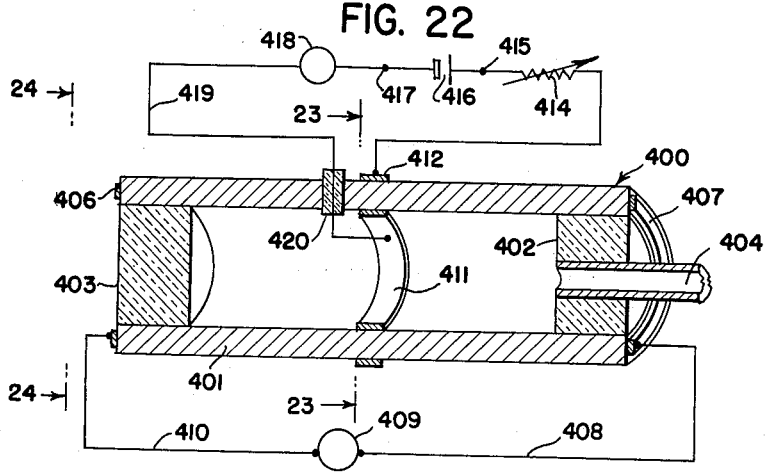
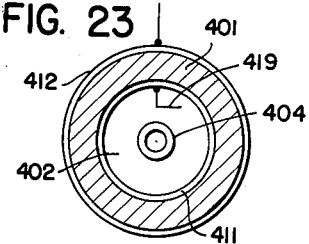
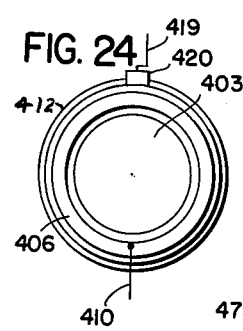
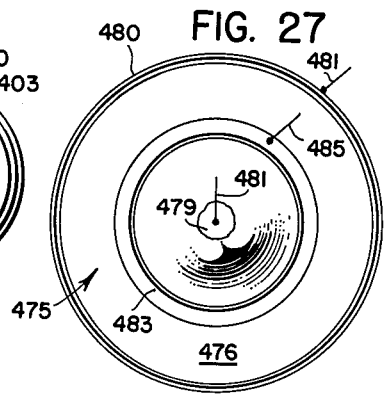
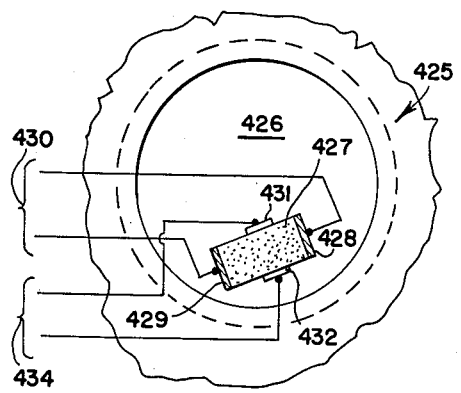
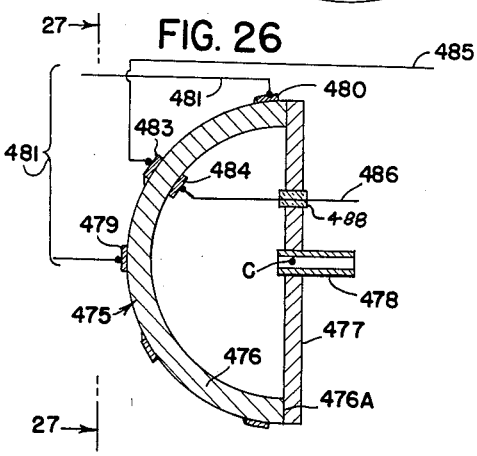
*INVENTOR.*
ROBERT R. KOOIMAN
BY Dugger & Johnson
ATTORNEYS

United States Patent Office 3,079,576
Patented Feb. 26, 1963

3,079,576
INTEGRAL STRAIN TRANSDUCER
Robert R. Koolman, Minneapolis, Minn., assignor to Rosemount Engineering Company, Minneapolis, Minn., a corporation of Minnesota
Filed Feb. 1, 1961, Ser. No. 86,337
37 Claims. (Cl. 338—4)

This invention relates to integral strain transducers, and more particularly to devices which are capable of being placed under pressure by a fluid pressure and of changing their electrical resistance or other electrical characteristics due to such applied fluid pressure. This application is a continuation-in-part of my applications, Ser. Nos. 22,186 and 22,187, both filed April 14, 1960, both abandoned.

Heretofore strain transducers for providing an electrical signal, as a result of applied pressure, have utilized a pressure responsive vehicle for imposing a movement upon some separate device such as an electrical resistance, the amount of which is changed due to such movement. These devices have the disadvantage that they require multiple parts, they frequently require motion multiplying mechanism, and they are not sufficiently rugged and are expensive to build.

It is an object of the present invention to provide a strain transducer capable of receiving a fluid pressure and of being motivated thereby, and which when so motivated will change its electrical characteristics for producing an electric signal. It is another object of the invention to provide a strain transducer and/or system for receiving fluid pressure either interiorly or exteriorly or both, and for providing an electrical signal as a result of such pressure. It is another object of the invention to provide an integral strain transducer of rugged construction which can be manufactured at low cost.

It is another object of the invention to provide integral strain transducer systems capable of use under extremely adverse conditions of temperature, stress, vibrations, etc.

It is another object of the invention to provide integral strain transducers in a variety of configurations and wherein the transducer material may be of metal or semi-conductors or treated semi-conductors.

It is another object of the invention to provide integral strain transducers wherein a semi-conductor is utilized and provision is made for providing signals of optimum effect or, where desired, of opposite sign when pressure is applied.

Other and further objects are those inherent in the invention herein illustrated, described and claimed and will be apparent as the description proceeds.

To the accomplishment of the foregoing and related ends this invention then comprises the features hereinafter fully described and particularly pointed out in the claims, the following description setting forth in detail certain illustrative embodiments of the invention, these being indicative, however, of but a few of the various ways in which the principles of the invention may be employed.

The mechanism is illustrated with reference to the drawings wherein corresponding numerals refer to the same parts, and in which:

FIGURE 1 is an isometric view showing a fragment of tube, for illustrative purposes in relation to the theory of the invention;

FIGURE 2 is an isometric view in longitudinal section showing one form of the invention;

FIGURE 3 is an isometric view in longitudinal section of another form of the invention;

FIGURE 4 is a longitudinal sectional view illustrating another form of the invention, together with the accompanying circuitry;

FIGURE 5 is a longitudinal sectional view for a modified form of the invention including the accompanying circuitry;

FIGURE 6 is a plan elevational view and accompanying diagrammatic view of the circuitry of a modified form of the invention;

FIGURE 7 is a plan view of a modified form of the invention, with the circuitry involved;

FIGURE 8 is a further modified form of the invention shown partially in longitudinal sectional view, together with the circuitry involved;

FIGURE 9 is a further modified form of the invention shown in longitudinal sectional view;

FIGURE 10 is a longitudinal sectional view and circuitry of a modified form of integral strain transducer according to the present invention;

FIGURE 11 is a longitudinal sectional view of another modified form of the present invention;

FIGURE 12 is a longitudinal sectional view, together with the circuitry of a further modified form of the present invention;

FIGURE 13 is a longitudinal sectional view of a further modified form of the invention, together with the circuitry;

FIGURE 14 is a longitudinal sectional view of another modified form of the present invention together with the circuitry;

FIGURE 15 is a sectional view of a modified form of the invention utilizing a semi-conductor pressure transducer element having a fixed edge support;

FIGURE 16 is a plan view of the device shown in FIGURE 15 as viewed from the direction 16—16 of FIGURE 15;

FIGURE 17 is a transverse sectional view through a modified form of the invention utilizing a treated semi-conductor disc;

FIGURE 18 is a plan view of the device shown in FIGURE 17 as viewed from the direction 18—18 of FIGURE 17;

FIGURE 19 is a plan view similar to FIGURE 18, but showing a further illustrative embodiment of the invention;

FIGURE 20 is a sectional view through a further illustrative form of semi-conductor transducer element;

FIGURE 21 is a further illustrative form of the invention utilizing a semi-conductor tube as the vessel;

FIGURE 22 is an isometric view in longitudinal section similar to FIGURE 1 but showing a still further modified embodiment of the invention together with the accompanying circuitry;

FIGURE 23 is a cross-sectional view taken along the line and in the direction of the arrows 22—22 of FIGURE 22;

FIGURE 24 is an end view taken along the line and in the direction of the arrows 24—24 of FIGURE 22;

FIGURE 25 is a plan view similar to FIGURE 19 but showing a still further modified embodiment of the invention;

FIGURE 26 is a longitudinal sectional view similar to FIGURE 13 but of another modified form of the invention;

FIGURE 27 is a plan view of FIGURE 26 taken along the line and in the direction of the arrows 27—27 of FIGURE 26;

FIGURE 28 is a longitudinal sectional view of a modified form of integral strain transducer of this invention, and FIGURE 29 is a fragmentary plan view of FIGURE 27 taken along the line and in the direction of the arrows 28—28.

The invention, in its simplest form, is a pressure containing vessel which can be tubular, according to some of the illustrations, or a pressure vessel having a circular member such as a disc or discs, or a sphere, or hemisphere or hemispheres, according to others of the illustrations, and in which the whole vessel, or selected portions thereof are stressed when fluid pressure is applied. The stress produced in the material of which the vessel (or certain portions of the vessel) is composed causes changes of resistance to occur, which are indicative of the pressure change.

According to the present invention, the application of pressure internally or externally of the vessel causes changes in dimension due to pressure loading, and causes changes in the resistivity of the vessel or portions thereof.

Various materials are suitable for use in providing the integral strain transducers of the present invention. Preferred materials are metal alloys such as manganin and an alloy of 42% nickel, 58% iron and various semi-conductor elements and compounds such as germanium, silicon, diamond, silicon carbide, indium antimonide, zinc telluride, gallium phosphide and rutile.

A material such as the alloy, manganin, exhibits characteristics very favorable for use in making the longer tubular and hemispherical configuration integral strain transducers of the present invention. Manganin, which is illustrative, has a high resistivity and low thermal coefficient of resistivity. Semi-conducting materials generally exhibit much larger strain co-efficients of resistivity than metals; however, their thermal co-efficient of resistivity is also proportionately higher. Semi-conductors, which in general can be fabricated less readily than metals, are best adapted for simpler configurations of integral strain transducers of the invention, such as short tubular, disc, and cup configurations.

The invention, in its simplest form, can be used to measure a uniform pressure wherein the pressure transducing device is a tubular member, or members, into or upon which a fluid pressure is applied.

FIGURE 1 shows a short section of a cylindrical pressure transducing element of the invention wherein the cylinder is designated 10 and has a wall thickness 11. According to the invention, pressure may be applied within the tube 10 or the tube 10 may be sealed so that pressure may be applied to the exterior surface of the wall forming the tube. When the material of which the tube is composed is thus subjected to such external or internal pressure, every particle of material within the tube is stressed and undergoes a change in resistivity. Thus, if one considers a particle 12 of material within the tube wall, it is subjected to stresses along three axes as shown in FIGURE 1, namely the axis $xx$, which is parallel to the centerline of the tube (or stated another way, lengthwise of the tube); along the axis $yy$, which is tangential to the circle 13, about the centerline, in which the particle 12 is found, and which may be considered as the hoop tension applied to the particle 12, and along the axis $zz$, which is a radial axis from the centerline CL outwardly through particle 12.

This same theory holds true whether the particle of material is a part of a tube as in FIGURES 1–9, or whether it is a part of a disc, such as in FIGURES 10–20.

Referring to FIGURE 2, the integral strain transducer here illustrated is a cylinder 20 having a plug 21 set in the left end, and a plug 22 set in the right end. Both plugs are sealed to the tube. The plug 22 is apertured so as to receive the pipe 13, by means of which a fluid pressure may be introduced into the cylinder. The plugs 21 and 22 are soldered or otherwise sealed to the tube 20. Electrical connections via lines 24 and 25 are provided on the ends of tube 20. Accordingly, when the tube 20 has pressure applied to the interior thereof, a change in resistance will occur as between lines 24 and 25, thereby providing the signal, indicating the amount of pressure.

Referring to FIGURE 3, in this form of the invention the cylinder 30 is provided with solid plugs 31 and 32 at opposite ends, these plugs being sealed by soldering or otherwise sealing to the material forming the wall of the cylinder. The cylinder thus plugged at each end forms an enclosed capsule which may be evacuated at time of sealing, and it is mounted within a pressure tight container 35, which is provided with an inlet connection at 36. The lead wires 33 and 34 which are connected to opposite ends of the cylinder 30 are taken out through the wall of the container 35 through pressure tight insulating bushings 33A and 34A.

In this form of the invention, pressure is applied via pipe 36, as shown by arrow 37 and this fluid pressure is accordingly imposed on all of the exterior surfaces of the cylinder 30 and of course of the plugs 31 and 32. The cylinder 30 is accordingly placed under stress and as a result its resistance is changed.

In FIGURE 4 there is provided a system utilizing a pair of integral strain transducers according to the present invention. This pair of transducers comprises identical cylinders, of which the one at the left in FIGURE 4 may be identical with the cylinder 20 in FIGURE 2. This cylinder is provided with the plug 21 at one end and the plug 22 at the opposite end together with the inlet connection 13 by means of which pressure may be introduced into the interior of the cylinder 20. The companion cylinder 40 is identical in physical dimensions with the cylinder 20 and is provided with a plug 41 at one end (which corresponds with the plug 21) and the plug 42 at the other end (which corresponds with the plug 22). However, the plug 42 does not have a connection such as at 13 but is merely provided with a vent hole at 43. Electrical connections are made via line 26 to junction 45 and thence through resistor 46 to junction 47 and then through battery 48 and line 49 to junction 50, from which a connection is made back to junction 25. From junction 50 a connection is also made to junction 51 on that end of cylinder 40 which is adjacent the plug 41. From junction 47 a circuit extends through the resistor 52 to junction 53 and thence to terminal 54 on the opposite end of cylinder 40. A galvanometer 55 is connected across junctions 45 and 53. When pressure is applied via arrow 56 through pipe 13 to the interior of cylinder 20, the cylinder 20 will be placed under stress and the resistance between terminals 24 and 25 will be changed. At the same time the resistance between terminals 51 and 54 on the tube 40 will not be changed, since the tube 40 is not under stress. However, since tube 20 and tube 40 are within close proximity of each other, and are accordingly subjected to the same temperature, resistance changes due to temperature changes will be cancelled out due to the circuit network that is shown, and the net effect will be to provide a reading across galvanometer 55 which is an indication of the pressure applied to the cylinder 20.

In FIGURE 5 there is illustrated a modified form of the invention similar to FIGURE 4 in which cylinders 20 and 40 are identical with those shown in FIGURE 4, with the single exception that the plug 42 of FIGURE 4 is provided with an aperture 43, whereas the corresponding plug 42A of FIGURE 5 is solid and is not provided with an aperture, and accordingly the tube 40 together with the plugs 41 and 42A form a sealed container similar to that shown in FIGURE 3. In FIGURE 5 there is provided a container 35 similar to that described with reference to FIGURE 3. In this system the pipe 13 which connects through plug 22 to the cylinder 20 is provided with a T at 13A to which the line 36 of the cylinder 35 is connected, so that when pressure is applied via arrow 56 to line 13 this pressure will not only be applied on the interior of the tube 20 but will also be applied through line 36 to the container 35 and hence to the exterior of the sealed tube 40. The circuitry connections shown in FIGURE 5 are the same as in FIGURE 4 and therefore need not be specifically described.

Accordingly, when pressure is applied via arrow 56 to the pipe 13, the pressure is introduced into the interior of the tube 20 thereby stressing this tube from the interior and it is applied to the exterior of the tube 40 thereby stressing it in the opposite direction, i.e. from the exterior. These stresses cause resistivity changes of opposite character which, through the circuitry illustrated in FIGURE 5, provide a greater signal at galvanometer 55 than is supplied in FIGURE 4.

In FIGURE 6 a system is illustrated which is similar to that shown in FIGURE 4 execpt that in the place of short, relatively lareg diameter tubes 20 and 40 as shown in FIGURE 4, in FIGURE 6 there is provided a long length of small diameter capillary tube generally designated under the bracket 60, and composed of equal portions 60A and 60B. This capillary tube is of uniform diameter and at one end of section 60A there is provided an enlarged pressure connection 61, and a terminal 24 similar to FIGURE 4. This length of capillary tube 60 is of uniform diameter throughout its length and at the midpoint of the tube it is sealed shut at 60C and is provided with a terminal at the point 50, which electrically serves parts 60A and 60B. The opposite end of part 60B of the tube is open at 62 and is provided with an electrical terminal at 54, similar to FIGURE 4. It is noted that the portion of the tube from the inlet connection 61 to the seal 60C provides a sealed chamber of capillary dimensions equal to one-half the total length of the tube 60 from the terminal 24 to the terminal 54 whereas that portion of the tube 60B from the seal 60C and terminal 50 to the open end 62 and terminal 54 is likewise a chamber of capillary dimensions which is equal in length to that from 24 to 60C but with this difference: It is open to the atmosphere at 62.

The circuitry for this form of the invention is identical with that shown in FIGURE 4 and therefore need not be further described.

Accordingly, when pressure is applied by way of arrow 56 through inlet connection 61, the portion of the capillary tube from the inlet to the seal-off at 60C, will be placed under stress, whereas that portion of the tube from 60C to 62 will not be so stressed but it is of the same physical dimensions and subject to the same temperature as is the portion from 61 to 62. The net result is that, with the circuitry shown, a signal will be provided at galvanometer 55 which is an indication of the pressure applied via arrow 56 to the inlet connection 61. The capillary tube formed as shown in FIGURE 6 has special applicability in many places where a small diameter tube can be accommodated to other mechanical structures.

FIGURE 7 is the same as FIGURE 6 except that the capillary tube is folded at the seal 60C and terminal 50, and the open end 62 is brought back to adjacent the inlet pipe 61, or the structure can be composed of two pieces of capillary tube which are sealed together and sealed off at 60C and provided with terminal 50. The two sections of capillary tubing thus extending alongside of each other may, if desired, be formed into a spiral as indicated under the bracket 60, see FIGURE 7, the spiral in this case being composed of the two portions 60A and 60B of the tube which lie parallel to each other separated by appropriate electrical insulation and are spiralled together. This form of mechanical construction perfectly accommodates itself to attachment of the double spiral configuration to any central mechanical support.

The functioning of the device is electrically the same as that shown in FIGURE 6.

In FIGURE 8, two tubes 95 and 96 are provided, each of which supplies a change in resistance when pressure is applied. The tube 95 is provided with plugs 97 at one end through which an inlet pipe 98 extends. The pipe 98 and plug 97 are hermetically sealed to each other and to the tube 95.

At the other end of the tube 95 there is provided a plug 99 through which the tube 96 extends, the tube 96 being hermetically sealed to the plug 99 and the plug 99 sealed to the tube 95. The end 96A of the tube 96 is furnished with a plug 96B so that it is sealed at this end. Electrical connections are provided at each end of each of the tubes 95 and 96 as shown. Thus a circuit extends from terminal 101 on tube 95 through line 102 to junction 103 and thence through line 104 to battery 105 and through line 106 to junction 107. From junction 107 a circuit extends through resistor 108 to junction 109 and then via line 110 to terminal 111 on the opposite end of tube 95. From terminal 112 on one end of tube 96 a circuit extends via line 113 to junction 103. From the other end of tube 96 a circuit extends from terminal 114 through line 115 to junction 116 from which a circuit extends back through resistor 117 to junction 107. A galvanometer 118 is connected between junctions 109 and 116. Pressure tight insulators are provided at 113A and 115A where lines 113 and 115 respectively pass through the wall of tube 95.

In FIGURE 9 there is illustrated another form of the invention wherein the tubes, corresponding to tubes 96 and 95 are made integral, such forms of construction being especially adapted where the material of which the device is constructed is of a semi-conductor such as germanium or silicon or semi-conductor compound such as silicon carbide. In FIGURE 9 there is a unitary structure having a base 120 and an annular flange (or cylinder) at 121 which, with the base, forms a cup shape. Within the annular flange (cylinder 121) there is co-axially formed a smaller inner annular flange (or cylinder) 122. These two flanges 121 and 122 are concentric and extend to the left from the base 120, as shown in FIGURE 9, and are such that they terminate at approximately equal distances from the base 120. The two flanges thus form a space 124 between them, and this space is sealed by means of an annular glass seal 125 which is fused to the flanges 121 and 122 so as to form a hermetic seal therewith. The glass seal 125, at one place, is provided with a tube 126 which extends through the seal into the space 124, so as to communicate therewith. The tube 126 is connected to a source of pressure as indicated by arrow 127, so that fluid under pressure is introduced into the space 124 which therefore stresses each of the cylinders 122 and 121 of the device. Connections are provided at 128 and 129 and 130 as shown. The wiring for the device shown in FIGURE 9 can be the same as in FIGURE 8, thus the connection 130 may be connected to line 104 of the circuitry shown in FIGURE 8 and the connections 128 and 129 are connected respectively to the lines 110 and 115 of the circuitry shown in FIGURE 8

One or both of the circuit resistors 46 and 52 of FIGURES 4, 5, 6 and 7, and circuit resistors 117 and 108 of FIGURE 8, can be made variable if desired for convenience in adjustment.

In FIGURES 2–9, the electrical terminals are illustrated as at the ends of the transducer elements, but it is to be understood that these terminals or additional terminals may be placed short of the ends, or at intermediate locations where other or different voltages or portions of voltages are desired to be read off. This is particularly true in respect to transducers composed of semi-conductors wherein the orientation of the crystal planes of the semi-conductor material has an effect on the places where maximum transducive effect will appear. Therefore, it is within the purview of the invention to locate the electrical terminals on any separated places on the element for obtaining the optimum signal effect.

Referring to FIGURE 10, the pressure transducer device is a vessel which can, conveniently, be in the form of a hemisphere 210 or any other cup-shaped container, having an edge or rim 211. Upon this edge or rim which can be flat, there is fastened a circular disc 212 which is soldered, brazed, or otherwise fastened in pressure tight relationship to the edge surface 211 of the container 210. The disc is made thin relative to its diameter so that membrane forces predominate under pressure loading. The container has a pressure inlet connection 214 which communicates with the interior thereof. A small slug 215 of metal forming an electric terminal is fastened to the center of the disc 212 and an electrical connection 216 is attached to the container 210 which, if it is metallic, acts as a terminal. When cup 210 is non-metallic, a separate ring terminal is supplied as at 240A and 241 of FIGURE 12. Lead wire 217 extends from terminal 215 to one terminal 218 of the bridge circuit generally designated 220. Lead wire 219 extends from terminal 216 to terminal 221 of the bridge network 220. The bridge network 220 contains terminals 222 and 223. A battery 224 is connected across terminals 218 and 223 and a galvanometer 225 is connected across terminals 221 and 222. A resistor 226 is connected between terminals 218 and 222, resistor 227 is connected between terminals 222 and 223; and resistor 228 is connected between terminals 221 and 223. Resistances 226, 227 and 228, or some of them, may be adjustable if desired.

When pressure is applied via pipe 14 to the interior of the vessel 210, the pressure generated therein will cause the circular membrane 212 to be deflected from its planar condition. If the pressure applied to pipe 214 is a positive pressure the membrane 212 will be flexed outwardly (or to the right) as shown in FIGURE 10. If a negative pressure is applied to pipe 214, the disc 212 will be flexed inwardly (or to the left) as shown in FIGURE 10. Flexure in either direction causes the material of which the disc 212 is composed to be stressed and this causes a change in resistance to occur between the center terminal 215 and the rim terminal 216, which change in resistance is reflected as a signal that actuates the galvanometer 225 of the output circuit. Accordingly, the signal is shown directly by a member which is a part of the pressure system upon which the pressure is applied.

FIGURE 11 is a similar to FIGURE 10 except that the container 210 is not provided with an inlet pipe 214 and the container 210 is sealed off by the circular disc 212. The entire closed vessel 210—212 is placed within a pressure tight receptacle generally designated 230 which has a fluid pressure inlet pipe at 231. The lead wires 217 and 219 are taken out through the walls of a pressure container 30 through suitable pressure tight insulators 217A and 219A in the wall. The external circuitry is identical with that shown in FIGURE 10.

Accordingly, when a pressure is applied to pipe 231 the circular membrane 212 will be deflected and stressed, and its resistance accordingly changed, which will be reflected as a signal at the read-out circuit.

In FIGURE 12 there is illustrated another form of the invention wherein a pair of membranes 240 and 241 of identical type are sealed in pressure tight relationship to a ring 242 of insulating material such as ceramic material. Each of the membranes 240 and 241 is provided with a terminal ring as at 240A and 241A and a central terminal as at 240B and 241B. The entire capsule, thus composed of the discs 240 and 241 which are attached in pressure tight relationship to the electrically non-conductive ring 242, is placed within a pressure container 44, which has an inlet 245. The pressure container is provided with insulators at 246—249. A circuit extends from the battery 250 via line 251 to terminal 252 and thence via line 253 to the terminal 241B. From terminal 252 the circuit extends via line 254 and resistor 255 to junction 256 and thence via line 257 to terminal 240B. From junction 256 a circuit extends via line 258 through galvanometer 259 to junction 260; a circuit also extends through resistor 262 to junction 263 and thence via line 264 to terminal 240A. From junction 263 a circuit also extends via line 265 to the opposite terminal of the battery 250 from the line 251.

When pressure is applied in the direction of arrow 260 to inlet pipe 245, the membranes 240 and 241 will be deflected inwardly thereby being stressed. This provides a change of resistivity, which is reflected as an output signal which is read on the galvanometer 259. It will be noted that in this system the two discs 240 and 241 constitute two legs of a bridge network, of which the other legs are composed of the resistors 255 and 262. Accordingly, there is a double signal generated by this arrangement, as compared to the arrangement in FIGURES 10 and 11.

Referring to FIGURE 13, there is illustrated another form of the invention which is composed of a disc 270 of metal, which is attached in pressure tight relation to the rim of a hemisphere 271. This can be most conveniently accomplished by brazing, welding or soldering the edge 270A of the disc to the internal surface of the hemisphere 271 which is adjacent thereto. A slug of metal at 271A forms a terminal which is at the axis of the hemisphere 271, and the disc 270 and constitutes the other terminal. A circuit extends from connection 270A on the disc 270 thence via line 272 to junction 273 which is one of the terminals of the bridge circuit generally designated 274. The circuit then continues via resistor 275 to junction 276 and thence via line 277 to the battery 278. The circuit then continues via line 279 to junction 280 of the bridge circuit and via line 281 to terminal 271A. From junction 276 of the bridge network, a circuit extends via resistor 282 to junction 283 and thence via resistor 284 to junction 280. The galvanometer 285 is connected across the junction 273 and 283 of the bridge network.

The disc 270 is provided with an inlet pipe 286 which communicates with the interior of the vessel which is formed by the disc 270 and the hemisphere 271. Accordingly, when pressure is applied via the pipe 286, as shown by the arrow 287, a pressure is communicated to the interior of the vessel 270—271, thereby imposing a stress upon the hemisphere 271, which therefore changes its resistance between the terminals 270A and 271A. This change in resistance constitutes a signal which is read by means of the galvanometer in the bridge network 274.

Referring to FIGURE 14, there is illustrated another form of the invention wherein two hemispheres are nested into the structure generally designated 290. The axis of this structure is along the line 293 and intersects the hemispheres at its poles 297 and 298. The hemispheres 291 and 292 join at the ring 295. In order to make a tight junction between the hemispheres 291 and 292, and the ring 295, the latter is preferably provided with two grooves 295A and 295B into which the edges of the hemispheres are fitted and then soldered or brazed in place. Ring 295 is thus a fluid tight closure between the hemispheres 291 and 292 and acts as an electrical terminal to said edges. The ring 295 forms an electrical terminal which is located in a plane at right angles to the axis 293, and (electrically) midway between the poles 297 and 298 of the hemispheres. At the poles 297 and 298 of the hemispheres, there are fastened terminals 292A and 291A respectively. Thus, for the hemisphere 291 there is provided a polar terminal 291A and for the hemisphere 292 of the sphere there is provided a polar terminal 292A. The terminal 292A is apertured to receive a pressure pipe 299 which communicates with the interior space S between the two hemispheres. From terminal 291A a circuit extends via line 300 to junction 301 and thence through resistor 302 to junction 303 and thence through resistor 304 to junction 305, whereupon the circuit continues via line 306 to the terminal 292A. From the ring 295 a circuit extends via line 307 through the galvanometer 308 and line 309 to the terminal 303. A battery 310 is connected across junctions 301 and 305.

Accordingly when pressure is applied in the direction of arrow 311, through pipe 299, to the space S between the hemispheres, the pressure will be communicated uniformly to all of the interior surfaces of the hemisphere 292, thereby stressing the material of such hemisphere in tension. Likewise, the pressure applied to the exterior of hemisphere 291 stresses that hemisphere in compression. These stresses change the resistances of each of the hemispheres 291 and 292, and accordingly the resistance of the hemisphere 291, as read between the polar terminal 291A and the equator terminal 295 will change a certain amount. Similarly, the resistance of the hemisphere 292 as read between the polar terminal 292A and the equator terminal 295 will likewise change the same amount. However, these changes in resistance produce opposite effects in the bridge network into which they are connected, and therefore produce approximately double the signal as provided in FIGURE 13.

Referring to FIGURE 15, there is illustrated another form of the invention wherein the pressure vessel 320 is provided with an inlet 321 and an opening defined by the ferrule 325—325. Within the ferrule there is fixedly attached the thick rim 323 of a semi-conductor disc 322, which is made integral with the rim 323. Terminals are placed on the disc portion 322 as at 326—327 and 328 as shown in FIGURE 16.

It is often desirable, when using a semi-conductor pressure transducer element that the surface of the semiconductor is treated so that it is impregnated with or combined with an element which changes the electrical resistance of the portion which is so treated. This is known as "doping." Thus, the arcuate section extending from the center terminal 326 and extending outwardly beyond the terminal 328, includes the portions A and B. This entire arcuate or pie-shaped section may be treated by doping the original surface of the semiconductive disc 323 with a material which is foreign to the semi-conductor material, and which, when combined with it, produces a compound or impurity relationship that reduces the resistivity throughout the treated section. As an example, the semi-conductor may be composed of silicon, indium-antemonide or germanium. It has been found, in the present invention, that a semi-conductor pressure transducer element which has a portion of its surface doped, will in many instances, have improved signal output under the conditions of stress that occur in the pressure transducer elements.

For example, the disc 322 may be composed of high purity "N"-type silicon exhibiting a resistivity in the order of 1,000–4,000 ohms per centimeter. A relatively heavy coat of silicon dioxide is then grown on the surface of the disc by subjecting it to an oxidizing atmosphere at elevated temperatures. This oxide coating is then etched off throughout the area of the segment desired to be doped, which as shown in FIGURE 16 is the pie-shaped segment including the area of terminals 326 and outwardly beyond the terminal 328. Then the semi-conductor element with the oxide coating etched away in the area desired to be doped is subjected to an arsenic atmosphere at an elevated temperature. The arsenic readily diffuses into the silicon but diffuses at a much slower rate through the protective coating of silicon dioxide. After the diffusion has proceeded to a selected depth, as for example to a depth of .0001 inch–.005 inch, or more, the treatment is stopped and the disc is then annealed and aged. Thereafter the electrical contacts 326, 327 and 328 are attached at the positions shown.

The diffusion process can be regulated in regards to time, temperature, and the quantity and type of doping material, so as to achieve a thickness and resistivity throughout the pie-shaped segment in the order of 1 ohm-centimeter. The selection of the area for doping can be "predetermined beforehand" and by known techniques, by examining the semi-conductor (or cutting it) according to a definite pattern with reference to its crystallization planes, or the areas selected for doping can be selected by experiment, merely by doping several areas, more than needed, and providing each area with terminals. Substantially all of the doped areas will produce some signal when the transducer is pressure stressed and measurements taken of the amount of signal response will show which areas produce the optimum signals. Thus, more doped areas than needed, variously oriented, would be made, and the best selected. This is an empirical selection.

The base material, here illustrated as the original silicon disc 322, acts essentially as an insulator in the presence of the low resistivity doped segments. In some cases one may use an "N"-type doping material on a "P"-type base material, and this results in a rectifying contact at the interface of the two materials. This rectifying action enhances the insulating properties of the base material.

The doping of a selected area of the semi-conductor material may also be accomplished by plating on or vacuum depositing a thin layer of the doping material over the region which is desired to be treated, and then carrying on the diffusion of the doping material at an elevated temperature, and thereafter annealing and aging the unit, after which the electrical contacts are applied as previously described.

In the illustration FIGURES 15 and 16, electrical circuits are connected to the three terminals and when pressure is applied to the connection 321, the disc 322 will be flexed, thereby causing the thin layer of material in the areas A and B, see FIGURE 16, to be stressed so that one area is in tension and the other is in compression, and when this occurs, the electrical resistance between the terminals 326 and 327 and between the terminals 327 and 328 will change, but not in the same amount or order. By appropriate instrumentation, the changing electrical signals thus derived may be calibrated in terms of pressure applied to the inlet 321.

In FIGURES 15 and 16 the disc element 322, being supported fixedly by the heavy rim 323 provides a reversal of flexure between the rim 323 and the center. This provides a diversity of signal as between the contacts 326—327 and the contacts 327—328. In the form of invention shown in FIGURES 17 and 18, the transducer element is a disc 335 which is supported by the free edge supports 333—334, which are in the form of O-rings, that are lightly clamped in the ferrule 332—332A—332B. When pressure is applied to the container 330, via inlet 331, the disc 335 will be held solidly against the O-ring 334, and will be flexed, and the flexure of the disc is in this instance a "free-edge" flexure, since no support other than a force directly against the disc is afforded by the O-ring 334 and this does not hold the edge of the disc against bending. The O-ring 333 is only lightly held against the surface 335 and does not measurably restrict the flexing of the disc produced by pressure against it.

As shown in FIGURES 18 and 19, the surface of the disc 335 may be doped according to varying patterns. In FIGURE 18 there are two pie-shaped segments CD emanating from the center terminal 336 and ending respectively at the terminals 338 and 337. These pie-shaped segments are doped, by treating the initially pure semiconductor material by impregnating it and/or reacting it with a compound which, in association with pure semiconductor material, will produce a lowering of the resistance as compared to the resistance of the pure material. Thus, in these areas C and D the treatment is as previously described, and these areas are relatively much more conductive than the original semi-conductor material of which the disc 335 is composed. The lead wires 339 are connected to the terminals 336—338 and when pressure is applied to the disc, causing it to flex, the resistance between terminals 336 and 337 will change and the resistance between terminals 336 and 338 will likewise change, but in opposite sign. Accordingly, such signal may be used in an appropriate bridge circuit, of the type previously described herein, for indicating the pressure applied to the inlet 331.

As shown in FIGURE 19, the area of the semi-conductor material which is doped need not be a pie-shaped area emanating from the center of the disc, but one or several random disposed areas E on the same disc may be utilized. A larger number of such areas than will be used may be doped and one or more of them selected by measurement for use, as previously described. The random disposition of the areas results because the crystal structure of the semi-conductor material, from which the disc is cut, will exhibit different resistivities, according to the relationship of the plane of the disc to the crystallographic planes of the original material. The optimum orientation of the plane of cut and of the area (areas) selected for doping for producing a unit of optimum response can be predetermined before cutting and doping by long and complicated calculations, and this method may be used but reasonably good and useful results can be determined empirically by experimentation, as described, for producing a useful product. These general rules apply to all configurations of semi-conductor transducers made according to the present invention.

Thus, in FIGURE 19 an area E is doped, and provided with terminals 341 and 342, which are connected to the external circuit 343 for reading the signal.

FIGURE 20 illustrates a form of disc configuration composed of semi-conductor material which will exhibit substantially a free edge support for the effective central area of the disc, and yet allow a solid clamping of the rim of the transducer. Thus, the disc 350 is provided with concentric grooves 351 and 352 at slightly different radii and of sufficient depth so as to leave between them a flange 354 of the original material, which serves to attach the rim portion 357 to the central portion of the disc. This flange is sufficiently thin so as to accept the flexure caused by pressure being applied to the disc in the direction of arrow 355 or 356, but will not so support the edge of the central portion of the disc as to prevent it from flexing as a free edge supporting disc. The doped areas on the central portion are selected and produced as previously described.

FIGURE 21 illustrates a form of tubular transducer 360 composed of semi-conductor material and illustrates that the doped areas of such semi-conductor material may be randomly disposed. Thus, for example, the area K and L, which are formed by treatment as previously described, are predetermined mathematically or selected by experiment so as to exhibit the optimum change of resistance for a given change of pressure applied to the tubular structure. Each of the areas is provided with terminals, thus area K being provided with terminals 361 and 362 whereas area L is provided with terminals 364 and 365. These may be utilized as legs of the same bridge circuit for reading the output signal, which may be calibrated in terms of pressure applied to the inside or outside of the tube as shown in FIGURES 2, 3, etc.

In any of the bridge circuits herein described one or more of the bridge resistances may be made variable for purposes of adjustment. It is usually preferable to adjust the bridge circuit to give a zero deflection of the galvanometer under conditions of no stress on the transducer elements, and to calibrate the galvanometer (or one resistor) in terms of pressure applied to the transducer fluid inlet.

In the embodiments of the invention illustrated in FIGURES 22–29 and described hereinafter, a constant current is passed through a semi-conductor and the output voltage perpendicular to the flow of current resulting from the application of a fluid pressure producing a force stressing the semi-conductor is measured. By locating the terminals at which the voltage measurement is taken in spaced relation relative to the terminals at which a current is applied to the semi-conductor perpendicular to the flow of current, and spaced from each other no voltage signal is produced when the semi-conductor is in an unstressed condition. However by applying a stress by introducing fluid under pressure into a container on which the semi-conductor is located or a container that at least in part is formed by the semi-conductor, the semi-conductor is stressed and thereby a measurement of the pressure applied may be obtained by using apparatus of the nature described hereinafter since the voltage obtained is a function of the stress in the system and the current perpendicular to the measured voltage.

In FIGURES 22–24, the integral strain transducer illustrated is a container 400 which is of a construction similar to container 20 of FIGURE 1. The container 400 is made up of a tube 401 of a semi-conductive material such as silicon and at either end plugs 402 and 403 are sealed to the tube. The plug 402 is apertured so as to receive the pipe 404, by means of which a fluid pressure may be introduced into the container.

A ring terminal (conductive electrode) 406 is secured to one end face of the tube concentric to the longitudinal axis of the tube while a second ring terminal 407 is likewise secured to the opposite end face of the tube. A lead wire 408 extends from terminal 407 to one terminal of an appropriate voltage measuring device 409. A second terminal of device 409 is connected to terminal 406 by lead wire 410.

A third ring terminal (conductive electrode) 411 is secured to the inner peripheral wall of the tube 401 while a fourth ring terminal 412 is secured to the outer peripheral wall concentric to the third terminal. Preferably the ring terminals 406, 408, 411 and 412 are made of a material such as nickel. The terminals are symmetrically located. Also the terminals 406 and 408 are located to measure the voltage perpendicular to the flow of current between terminals 411 and 412.

In order to produce a flow of current between the last mentioned terminals, a variable resistor 414 is connected across junction 415 and terminal 412, while battery 416 is connected across junctions 415 and 417. An ammeter 418 is connected across junctions 417 and terminal 411, the lead wire 419 connecting the ammeter to terminal 411 being taken out through the wall of container through a pressure tight insulating bushing 420. By passing a constant current between terminals 411 and 412 when no fluid pressure is applied through pipe 404, no voltage is indicated between terminals 406 and 407. However upon applying pressure at pipe 404 the container 400 is placed under stress and accordingly a voltage measurement indicative of the pressure is obtained at terminals 406 and 407.

It is to be understood that the source of current may be applied across terminals 406 and 407, and that the voltage measurement taken across terminals 411 and 412 instead are described heretofore. Also the terminals 411 and 412 may be made to extend substantially the axial length of the tube intermediate plugs 402 and 403, if desired.

Another embodiment of the invention utilizing a treated semi-conductor disc and generally designated 425 is in part illustrated in FIGURE 25. The disc 426 of the embodiment, generally designated 425, has a doped area 427 that is prepared in accordance with the principles set forth in the discussion of the embodiments of FIGURES 15–19. The disc 426 having the doped area 427 is mounted to form part of a container such as the disc 212 of FIGURE 10 or FIGURE 12 or mounted on the container 320 of FIGURE 15 or container 330 of FIGURE 17, it being understood that the disc 426 is made of a semi-conductive material. At one end of the doped area 427 there is provided a terminal 428 while at the opposite end there is provided a terminal 429. The terminals 428, 429 are connected through lead wires 430 to circuitry such as illustrated in FIGURE 22 for applying current through said terminals.

Intermediate the terminals 428 and 429 and on one side of the doped area there is provided a terminal 431 and on the opposite side there is a terminal 432. The terminals 431 and 432 are located to measure the voltage, if any, perpendicular to the flow of current through terminals 428 and 429, the aforementioned terminals being symmetrically located. Lead wires 434 connect terminals 431 and 432 to an appropriate device to measure the voltage at said terminals. Accordingly when no pressure is applied to disc 426 and a constant current is applied across terminals 428 and 429 no voltage is observed across terminals 431 and 432, however, by applying a pressure to the container in which disc 427 is mounted or forms a part of, an indication on the device connected at 434 such as set forth relative to embodiment 400 is obtained.

As shown in FIGURES 28 and 29 the use of a doped area on a semi-conductor may be located other than on a flat surface. For example, the doped area 441 of the embodiment 440 of FIGURES 28 and 29 is formed on the hemisphere 442 that is made of a semi-conductive material, the thickness being greatly exaggerated in FIGURE 28 for purposes of illustration. A circular disc 444 is attached to the edge of the hemisphere in pressure tight relation therewith. A pipe 445 opens into the interior of the thus formed container similarly as that illustrated in FIGURE 10. However it is to be understood that the container of embodiment 440 may be located within an enclosed container such as illustrated in FIGURE 11 and in this case there would not be provided a pipe 445 opening into container 440.

Terminals 446 are provided on the oppositely disposed sides of the area 441 to applied current therethrough while terminals 447 are provided on the other pair of sides, each terminal being located as embodiment 425. The voltage is measured across lead wires 449 by a device in the manner described with reference to FIGURE 22, lead wires 449 being connected to terminals 447. A source of current is connected to lead wires 450 which in turn are connected to terminal 446.

It is to be understood that a disc 425 together with its circuitry as shown in FIGURE 25 may be substituted for the disc 444 of FIGURE 28. In such a case it is not necessary that the hemisphere 442 be made of a semi-conductive material. Also it is to be understood that the embodiment 440 may also be modified by using a semi-conductive hemisphere without a doped area 441 and a signal of the nature described heretofore will be produced through stressing the container, provided the terminals are connected to the hemisphere in spaced relationship such as illustrated in FIGURE 29.

Another embodiment of the invention, generally designated 475 and illustrated in FIGURES 26 and 27, comprises a hemisphere 476 of a semi-conductive material. A circular disc 477 is attached to the hemisphere to form a pressure tight seal with the edge 476A thereof. A pipe 478 opens through the disc to enable applying a pressure to the interior of the thus formed container.

A slug of metal forms a terminal 479 at the axis of the hemisphere. A ring terminal (conductive electrode) 480 is attached to the hemisphere concentric to said axis and angularly spaced from terminal 479. Lead wires 481 connect the terminals 479, 480 to an appropriate source of current such as described relative to FIGURE 22.

A conductive ring terminal 483 is secured to the outer surface of the hemisphere 476 to be concentric to the axis of the hemisphere, angularly spaced from terminals 479, 480 and intermediate terminals 479, 480. A second ring terminal 484 is likewise attached to the hemisphere 476 other than that it is attached to the inner peripheral wall thereof and it is located on a radius line that extends through the center of curvature C of the hemisphere and passes through terminal 483 whereby the terminals are located perpendicular to the flow of current.

Lead wire 485 connects terminal 483 to one terminal of an appropriate voltage measuring device such as described heretofore while lead wire 486 is connected to the opposite terminal of said device. The lead wire 486 is extended through a pressure tight insulating bushing 488 in the membrane 477 and connected to terminal 484. The lead wires 485, 486 are connected to a source of constant current such as indicated in FIGURE 22. It is believed the operation of embodiment 475 is apparent from the description of the various embodiments described heretofore and therefore will not be set forth.

It is to be understood that embodiment 475 may be modified by providing a disc without a pipe located therein and mounted in an enclosed container such as container 230 of FIGURE 11. In such a case the fluid pressure would exert a force on the exterior of the hemisphere rather than the interior. Appropriate pressure tight bushing would be provided in the outer container to have the respective lead wires extend to a current source and a voltage measuring device.

In each one of the embodiments described heretofore, the container in an unstressed condition has a wall portion of a given electrical conduction characteristic. However upon stressing said wall portion, said electrical conduction characteristic is changed and a measurement of this change gives an indication of the fluid pressure that the container is subjected to that brings about the stressed condition.

This application is a continuation-in-part of my applications Serial Nos. 22,186 and 22,187, both filed April 14, 1960.

As many widely apparently different embodiments of this invention may be made without departing from the spirit and scope thereof, it is to be understood that I do not limit myself to the specific embodiments herein.

What I claim is:

1. An integral strain transducer comprising a pressure-tight container constructed so as to be capable of being subjected to pressure, said container including a wall portion which is stressed when the container is subjected to pressure and which is composed of a material capable of changing its electrical resistance between spaced locations thereon when so stressed, and separate electrical terminals solidly affixed electrically and mechanically at said spaced locations, said terminals being of a character such that the area of contact between the terminal and the container will remain substantially constant.

2. The transducer specified in claim 1 further characterized in that said wall portion is composed of a semi-conductor having a certain resistance between said terminals when the semi-conductor is not stressed and a different resistance between said terminals when the semi-conductor is stressed.

3. The transducer specified in claim 1 further characterized in that said wall portion is composed of a material having a prescribed electrical resistance generally, a portion of the said wall being of different purity, said electric terminals being at spaced locations on said portion.

4. The transducer of claim 1 further characterized in that said wall portion is a cylinder of semi-conductor material.

5. The transducer of claim 1 further characterized in that said wall portion is a membrane of semi-conductor material.

6. The transducer of claim 1 further characterized in that said wall portion is a disc of semi-conductor material, said disc edge having a free-edge attachment to the contiguous portions of the container whereby bending of the disc due to applied pressure is not substantially restrained at said edge attachment.

7. The transducer of claim 1 further characterized in that said wall portion is a disc of semi-conductor material, the edge of said disc being fixedly attached to the contiguous portions of the container.

8. The transducer of claim 1 further characterized in that said wall portion is composed of a semi-conductor of a certain purity and electrical resistivity, a segment of the area of said semi-conductor being rendered less pure by introducing therein a material which lowers the resistance of the semi-conductor material, said segment being a shallow layer on said semi-conductor, said electrical terminals being located along said segment.

9. The transducer of claim 8 further characterized in that more than two electrical terminals are provided at spaced locations along said segment.

10. The transducer of claim 1 further characterized in that said wall portion is composed of a semi-conductor of a certain purity and electrical resistivity and several segments of the semi-conductor are rendered less pure by introducing therein a material which lowers the resistance of the semi-conductor material and each segment, each segment being a shallow layer on said semi-conductor and each segment is provided with spaced electrical terminals thereon.

11. The transducer specified in claim 8 further characterized in that said segment is located in respect to the crystallographic planes of the semi-conductor so as to provide optimum change in resistivity between said electrical terminals when the transducer is subjected to pressure.

12. The transducer of claim 1 further characterized in that said wall portion is composed of a semi-conductor of a certain purity and electrical resistivity and a segment of the area of said semi-conductor is rendered less pure by introducing therein a material which lowers the resistance of the semi-conductor material, said segment being a shallow layer on said semi-conductor, said material introduced into the semi-conductor being selected so as to provide a rectifying interface between the shallow layer and the semi-conductor contiguous thereto, said electrical terminals being located along said segment.

13. The transducer of claim 1 further characterized in that said wall portion is composed of a semi-conductor of a certain purity and electrical resistivity, at least two segments on the surface of said semi-conductor being rendered less pure by introducing therein a material which lowers the resistance of the semi-conductor in said segments, said segments being shallow layers on said semi-conductor, electrical terminals located at spaced positions on said segments, said segments being located at positions on the surface of said semi-conductor so that the stress produced in the semi-conductor when pressure is applied will cause a change of resistance between the terminals of one segment which is opposite in sign to the change in resistance simultaneously produced between the terminals of another segment.

14. An integral strain transducer comprising a tubular member of electrically conductive material, at least one end of said tubular member being sealed, electrical terminals at two places along said tubular member, said places being axially spaced along said tubular member, said terminals being of fixed area and solidly attached to the tubular member, and a pressure means connected to said tubular member for applying a fluid pressure to the walls of said tubular member.

15. The apparatus of claim 14 further characterized in that the pressure means communicates with the interior of said tubular member for applying fluid pressure to the interior of said member.

16. The apparatus of claim 14 further characterized in that said tubular member is sealed at both ends, and said pressure means includes a container in which the tubular member is positioned and in which pressure may be established.

17. An integral strain transducer system comprising first and second tubular members of electrically conductive material, the first of which is closed for establishing a pressure therein, pressure means connected to said first tubular member for imposing a pressure on the walls of said tubular member, and electrical terminals at spaced places on each of said tubular members, said terminals being of fixed area and solidly attached to the tubular member.

18. The system of claim 17 further characterized in that said first and second tubular members are separate tubes and said pressure means is connected to at least one of said tubes for imposing a pressure thereon.

19. The system of claim 17 further characterized in that said first and second tubular members are composed of first and second lengths of capillary tubing having adjacent ends sealed and connected together, the opposite end of the first length of tubing being connected to said pressure means, and the opposite end of the second length of tubing being open and electrical connections at said opposite ends of each length of tubing and where said lengths of tubing are connected.

20. The system of claim 19 further characterized in that said first and second tubular members are nested one inside the other.

21. An integral strain transducer comprising a tubular member sealed at opposite ends, electrical terminals of fixed area solidly attached at spaced places on said tubular member, said transducer being composed of manganin.

22. An integral strain transducer comprising a tubular member sealed at opposite ends, electrical terminals of fixed area solidly attached at spaced places on said tubular member, said transducer being composed of a semi-conductor.

23. An integral strain transducer comprising an outer cylindrical tube and an inner cylindrical member of smaller diameter nested together with the inner cylindrical member inside the outer cylindrical tube so as to provide an annular space between them, seal means closing the ends of said annular space so as to form a pressure tight space therebetween, a pressure connection into said space, and electrical terminals on the outer cylindrical tube said electrical terminals being of fixed area and solidly attached to said tube.

24. The transducer of claim 23 further characterized in that the outer cylindrical tube is integral with the inner cylindrical member at one end.

25. The transducer of claim 23 further characterized in that the outer cylindrical tube and inner cylindrical member are integral at one end and are composed of semi-conductor material.

26. An integral strain transducer comprising a pressure-tight container constructed so as to be capable of being subjected to pressure, said container including a wall portion which is stressed when the container is subjected to pressure and which changes its electrical characteristics when stressed, first electrical terminals of constant area fixedly attached to said wall portion, said first terminals being adapted to be connected to a source of electricity to provide a current flow in said wall portion, second terminals of constant area fixedly connected to said wall portion in spaced relation to the first terminals.

27. The transducer of claim 26 further characterized in that said terminals are located along a certain line, that the second terminals are located on a line at 90° to the flow of current in the direction of said certain line and that with no stress applied to the container and a current flow condition, the potential between the second terminals is of a prescribed value.

28. The transducer of claim 26 further characterized in that said wall portion is a cylinder of semi-conductor material.

29. The transducer of claim 26 further characterized in that said wall portion is composed of a semi-conductor having a treated area to change the electrical characteristics thereof and said terminals are located in said treated area.

30. An integral strain transducer comprising a circular closure member of thin electrically conductive material forming at least one wall of a pressure vessel to which said closure member is attached in pressure sealed relationship, said circular closure member being composed of a material which changes its electrical resistance when it is stressed, electrical terminal means at spaced locations on the circular closure member, said terminals being solidly affixed mechanically and electrically on said closure member, said terminals being of a character such that the area of contact of the terminal and the closure member remains constant, and pressure means connected to the pressure vessel for applying pressure thereto for thereby stressing the circular closure member.

31. The apparatus of claim 30 further characterized in that the circular closure member is a disc.

32. The apparatus of claim 30 further characterized in that the circular closure member is spherical.

33. The apparatus of claim 30 further characterized in that the pressure means comprises a pressure connection communicating with the interior of the pressure vessel.

34. The apparatus of claim 30 further characterized in that the circular closure member is of manganin.

35. An integral strain transducer assembly comprising a pair of discs of electrically conductive material fastened in pressure-tight relationship to opposite edges of a ring of electrically non-conductive material, terminal means around the periphery of each disc and at the center of each disc and pressure means connected to the disc and ring assembly for imposing a fluid pressure thereon for stressing the discs.

36. An integral strain transducer assembly comprising a pair of thin circular electrical conductive elements arranged coaxially and spaced relative to each other, and with their circular peripheries proximate, an electrical terminal connected to the peripheries of said elements so as mechanically to join such peripheries in sealed relationship and to constitute an electrical terminal common to said peripheries, an electrical terminal attached to each element at its axis and a pressure connection through said assembly into the sealed space between said elements.

37. The assembly of claim 36 further characterized in that the circular elements are hemispheres, one nested within the other in spaced relationship.

References Cited in the file of this patent

UNITED STATES PATENTS

| | | |
|---|---|---|
| 1,896,193 | Corson | Feb. 7, 1933 |
| 2,365,015 | Simmons | Dec. 12, 1944 |
| 2,398,372 | Green | Apr. 16, 1946 |
| 2,421,907 | Postlewaite | June 10, 1947 |
| 2,472,045 | Gibbons | May 31, 1949 |
| 2,745,284 | Fitzgerald et al. | May 15, 1956 |
| 2,872,812 | Jones et al. | Feb. 10, 1959 |

FOREIGN PATENTS

| | | |
|---|---|---|
| 1,177,677 | France | Apr. 28, 1959 |